(12) United States Patent
Lee et al.

(10) Patent No.: US 10,843,622 B2
(45) Date of Patent: *Nov. 24, 2020

(54) CONTROL SYSTEM OF AUTONOMOUS VEHICLE AND CONTROL METHOD THEREOF

(71) Applicant: HYUNDAI MOBIS CO., LTD., Seoul (KR)

(72) Inventors: Eun Jeong Lee, Yongin-si (KR); Seung Woo Baek, Yongin-si (KR); Ban Suk Choi, Yongin-si (KR); Cheon Seop Shin, Yongin-si (KR); Jun Hyuk Cha, Yongin-si (KR); Moo Kwan Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,686

(22) Filed: Dec. 28, 2018

(65) Prior Publication Data

US 2020/0156533 A1    May 21, 2020

(30) Foreign Application Priority Data

Nov. 16, 2018    (KR) .......................... 10-2018-0141618

(51) Int. Cl.
*G08G 1/095*    (2006.01)
*B60Q 1/50*    (2006.01)
(Continued)

(52) U.S. Cl.
CPC ............. *B60Q 1/50* (2013.01); *G05D 1/0246* (2013.01); *G06K 9/00362* (2013.01); *G06K 9/00805* (2013.01)

(58) Field of Classification Search
CPC .... B60Q 1/50; G05D 1/0246; G06K 9/00362; G06K 9/00805
See application file for complete search history.

(56) References Cited

U.S. PATENT DOCUMENTS 9,196,164 B1 * 11/2015 Urmson ................. B60Q 5/005
9,475,422 B2 * 10/2016 Hillis ....................... G06F 3/017
(Continued)

FOREIGN PATENT DOCUMENTS

DE    102013217057 A1    3/2014
DE    102015225411 A1    6/2017
(Continued)

OTHER PUBLICATIONS

Partial European Search Report of corresponding Patent Application No. 18248167.1—15 pages (dated Aug. 30, 2019).
(Continued)

*Primary Examiner* — Quang Pham
(74) *Attorney, Agent, or Firm* — Knobbe Martens Olson & Bear LLP

(57) ABSTRACT

A control system of an autonomous vehicle may include: a camera unit installed on a vehicle body, and configured to take an image of a pedestrian; a measurement unit installed on the vehicle body, and configured to measure a position of the pedestrian and a distance to the pedestrian; a control unit configured to receive data of the camera unit and the measurement unit; and an image irradiation unit configured to operate according to a control signal of the control unit, and irradiate light to one or more of the pedestrian and a road.

8 Claims, 20 Drawing Sheets

(51) Int. Cl.
*G05D 1/02* (2020.01)
*G06K 9/00* (2006.01)

(56) References Cited

U.S. PATENT DOCUMENTS

| | | | | |
|---|---|---|---|---|
| 9,845,043 | B1* | 12/2017 | Webb | B60W 50/0098 |
| 9,855,890 | B2* | 1/2018 | James | B60Q 1/525 |
| 9,904,375 | B1* | 2/2018 | Donnelly | G05D 1/00 |
| 9,944,405 | B2* | 4/2018 | Mouton | B64C 27/006 |
| 9,975,649 | B1* | 5/2018 | Ross | B64D 45/00 |
| 10,043,395 | B2* | 8/2018 | Morel | B60K 37/06 |
| 10,118,537 | B2* | 11/2018 | Kunii | G03B 21/00 |
| 10,134,280 | B1* | 11/2018 | You | B60Q 1/34 |
| 10,173,577 | B2* | 1/2019 | Albou | G06F 3/011 |
| 10,189,402 | B2* | 1/2019 | Asaoka | B60Q 1/346 |
| 10,239,440 | B2* | 3/2019 | Asaoka | B60Q 1/0023 |
| 2011/0285519 | A1* | 11/2011 | Scheuermann | B60Q 1/50 340/425.5 |
| 2012/0290132 | A1* | 11/2012 | Kokubo | B25J 9/1666 700/255 |
| 2013/0130674 | A1* | 5/2013 | De Wind | B60Q 1/2696 455/420 |
| 2015/0203023 | A1* | 7/2015 | Marti | B60Q 1/503 340/425.5 |
| 2015/0336502 | A1* | 11/2015 | Hillis | B60Q 1/26 701/23 |
| 2017/0140651 | A1* | 5/2017 | Lee | B60Q 1/525 |
| 2017/0144584 | A1* | 5/2017 | Asaoka | B60Q 1/0023 |
| 2018/0039273 | A1* | 2/2018 | Delp | B60W 50/14 |
| 2018/0039917 | A1* | 2/2018 | Buttolo | G06Q 10/0631 |
| 2018/0072313 | A1* | 3/2018 | Stenneth | B60W 30/09 |
| 2018/0074495 | A1* | 3/2018 | Myers | B60K 28/06 |
| 2018/0075565 | A1* | 3/2018 | Myers | G05D 1/0088 |
| 2018/0079284 | A1* | 3/2018 | Choi | B60J 1/17 |
| 2018/0079463 | A1* | 3/2018 | Pearce | B60Q 1/2603 |
| 2018/0082588 | A1* | 3/2018 | Hoffman, Jr. | G08G 1/166 |
| 2018/0173237 | A1* | 6/2018 | Reiley | G05D 1/0061 |
| 2018/0174460 | A1 | 6/2018 | Jung et al. | |
| 2018/0284780 | A1* | 10/2018 | McWhirter | G01S 7/4861 |
| 2019/0106050 | A1* | 4/2019 | Kamhi | G06K 9/00805 |
| 2019/0205667 | A1* | 7/2019 | Avidan | G06K 9/00805 |
| 2019/0220677 | A1* | 7/2019 | Lipson | G06K 9/2018 |
| 2019/0272484 | A1* | 9/2019 | Saito | G07B 15/00 |

FOREIGN PATENT DOCUMENTS

| | | |
|---|---|---|
| EP | 3216653 A1 | 9/2017 |
| EP | 3222458 A1 | 9/2017 |
| JP | 2008-007079 A | 1/2008 |
| KR | 10-2018-0115986 A | 10/2018 |

OTHER PUBLICATIONS

Non-Final Office Action of U.S. Appl. No. 16/705,946—24 pages (dated May 1, 2020).

* cited by examiner

CONTROL SYSTEM OF AUTONOMOUS VEHICLE AND CONTROL METHOD THEREOF

CROSS-REFERENCES TO RELATED APPLICATIONS

The present application claims priority to Korean application number 10-2018-0141618, filed on Nov. 16, 2018, which is incorporated by reference in its entirety.

BACKGROUND OF THE INVENTION

The present invention relates to a control system and method of an autonomous vehicle, and more particularly, to a control system of an autonomous vehicle and a control method thereof, which can secure the safety of a pedestrian, and enable a passenger to easily identify a vehicle to get in.

In general, an autonomous vehicle refers to a vehicle that moves by itself even though a driver does not drive the vehicle.

A variety of techniques are required for an autonomous vehicle to move by itself. In particular, advanced sensors capable of recognizing surrounding objects and a high-performance graphic processing device are installed in an autonomous vehicle. The advanced sensor measures a distance between objects, and senses danger to enable a driver to see all areas without a blind spot. The graphic processing device recognizes the surrounding environment of the vehicle through a plurality of cameras, and analyzes images to help the vehicle to stably operate. Furthermore, the graphic processing device may grasp the meanings of various safety signs, or monitor whether a vehicle in front suddenly stops or a person or animal suddenly runs into a road.

Such an autonomous vehicle autonomously decides a traveling path by recognizing the surrounding environment through various sensors, and independently drives using its own power. Furthermore, a driver does not need to care about a road condition, and the autonomous vehicle avoids an obstacle by itself even though the obstacle suddenly appears, and autonomously drives to a destination while maintaining distances from vehicles at the front and rear thereof.

However, there occurs an accident in which a pedestrian is hit and injured by an autonomous vehicle in operation. Furthermore, since a user may have difficulty in identifying an autonomous vehicle to get in, the user's convenience may be degraded. Therefore, there is a demand for a structure capable of solving the problem.

The related art of the present invention is disclosed in Korean Patent Publication No. 2018-0115986 published on Oct. 24, 2018 and entitled "apparatus and method for autonomous driving control, vehicle system".

SUMMARY OF THE INVENTION

Embodiments of the present invention are directed to a control system of an autonomous vehicle and a control method thereof, which can secure the safety of a pedestrian, and enable a passenger to easily identify a vehicle to get in.

In one embodiment, a control system of an autonomous vehicle may include: a camera unit installed on a vehicle body, and configured to take an image of a pedestrian; a measurement unit installed on the vehicle body, and configured to measure a position of the pedestrian and a distance to the pedestrian; a control unit configured to receive data of the camera unit and the measurement unit; and an image irradiation unit configured to operate according to a control signal of the control unit, and irradiate light to one or more of the pedestrian and a road.

The measurement unit may include: a position measurement unit configured to measure the position of the pedestrian, and transfer the measured value to the control unit; and a distance measurement unit configured to measure a distance between the pedestrian and the vehicle body, and transfer the measured value to the control unit.

The image irradiation unit may include: a first irradiation unit configured to irradiate light to the lower side of the pedestrian; and a second irradiation unit configured to irradiate an image onto the surface of the road.

The control system may further include an image display unit installed at one or more of the front and side of the vehicle body, and configured to inform the pedestrian of information as an image.

The control system may further include a side display unit installed at a side of the vehicle body, and configured to operate according to a control signal of the control unit and display a specific pattern of image to a target passenger.

The control system may further include a scanning unit configured to scan the body of the target passenger and transfer the scan result to the control unit.

The control system may further include a guide irradiation unit installed on the vehicle body, and configured to irradiate light in a lateral direction of the vehicle body in order to guide the target passenger to get in the vehicle.

In another embodiment, a control method of an autonomous vehicle may include: a first measurement step in which a measurement unit is operated to measure a position of a pedestrian and a distance between the pedestrian and a vehicle body; a first irradiation step in which a first irradiation unit is operated to form a hot spot zone by irradiating light to the lower side of the pedestrian, when the distance between the pedestrian and the vehicle body is within a first range; a second measurement step in which a camera unit is operated to measure the pedestrian; a second irradiation step in which the first irradiation unit is operated to form the hot spot zone and a guide line at the lower side of the pedestrian, when the distance between the pedestrian and the vehicle body is within a second range; and a third irradiation step in which the first and second irradiation units are operated to provide an image related to road crossing to the pedestrian, when the distance between the pedestrian and the vehicle body is within a third distance.

The first range may be larger than the second range, and the second range may be larger than the third distance.

The second irradiation step may include forming the guide line by irradiating colorful light to the boundary of the road facing the pedestrian.

The third irradiation step may include displaying a warning image to warn the pedestrian against crossing the road, when a control unit receiving the information of the measurement unit determines that the vehicle has precedence.

The warning image may include one or more of an image displayed on the surface of the road and an image displayed on the front or side of the vehicle body.

The third irradiation step may include irradiating a rectangular frame onto the road surface at a stop position and then irradiating an image onto the road facing the pedestrian to guide the pedestrian to cross the road, when the control unit receiving the information of the measurement unit determines that the pedestrian has precedence.

In another embodiment, a control method of an autonomous vehicle may include: a moving step in which a vehicle body moves toward a target passenger; a pattern display step of displaying a specific pattern of image to the target passenger through a side display unit; a stop step in which the vehicle body stops in front of the target passenger; and an identification step in which a scanning unit scans the body of the target passenger, and a control unit identifies the target passenger based on information of the scanning unit.

The identification step may include scanning one or more of the palm, face and iris of the target passenger, and determining whether the scan result coincides with information stored in a storage unit.

The control method may further include automatically opening a door, when authentication for the target passenger is passed at the identification step.

In accordance with the embodiments of the present invention, the control system and the control method may help the autonomous vehicle and the pedestrian to recognize each other in a range from a long distance to a short distance, and thus guide the pedestrian M1 to cross the road or stop the pedestrian from crossing the road, which makes it possible to secure the safety of the pedestrian.

Furthermore, the autonomous vehicle may approach a passenger and inform the passenger that the autonomous vehicle is a vehicle to get in, using the side lighting of the autonomous vehicle. Furthermore, the autonomous vehicle may open/close a door and induce the passenger to get in the vehicle, using a lighting pattern, which makes it possible to improve the convenience of the passenger.

Furthermore, when the pedestrian approaches the autonomous vehicle which is autonomously driving, the control unit may analyze a camera sensor image, determine the height and age of the pedestrian, and provide contents suitable for the pedestrian, thereby securing the safety of the pedestrian.

DESCRIPTION OF SPECIFIC EMBODIMENTS

Hereafter, a control system and method of an autonomous vehicle in accordance with an embodiment of the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
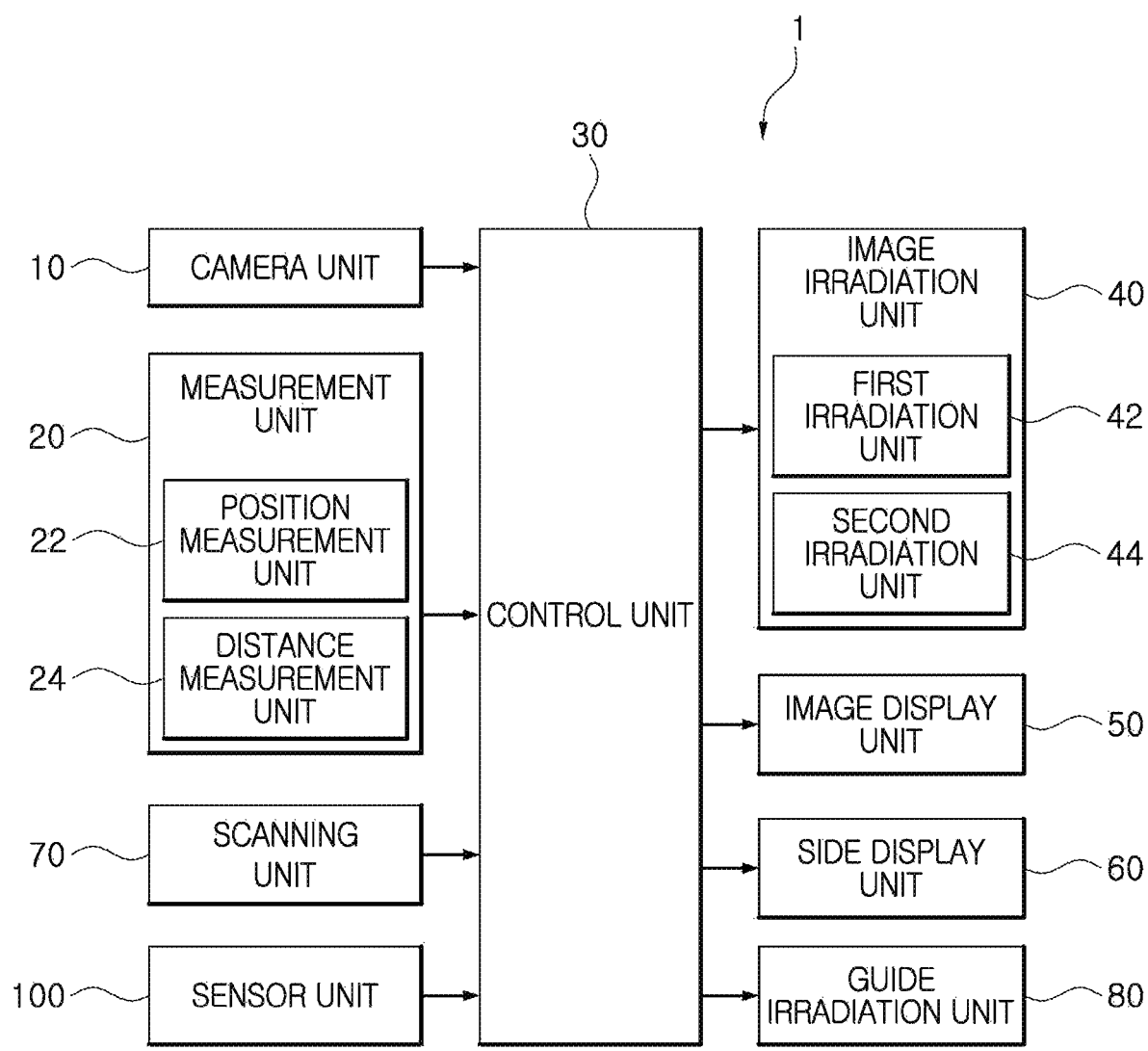
FIG. 1 illustrates a control system of an autonomous vehicle in accordance with an embodiment of the present invention.
Figure 2:
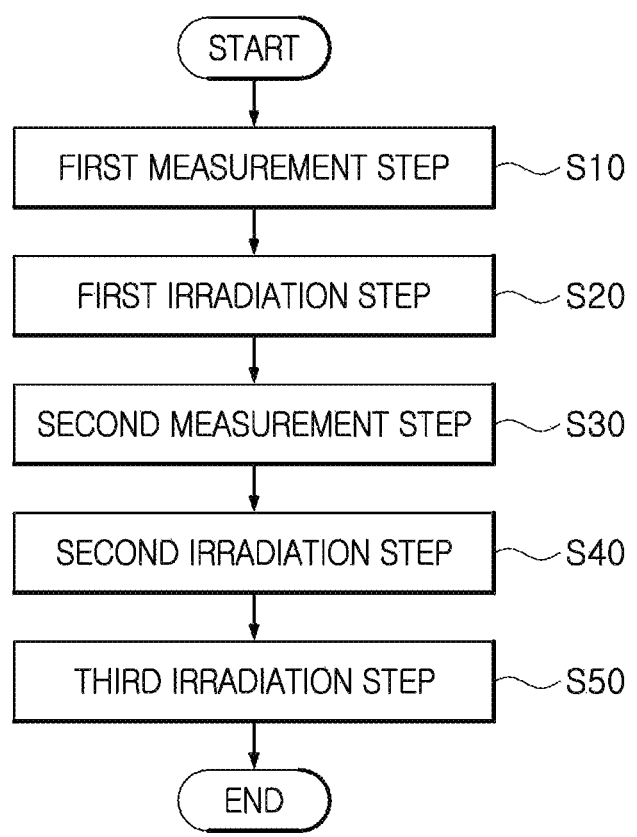
FIG. 2 is a flowchart illustrating a control method of the control system of the autonomous vehicle in accordance with an embodiment of the present invention.
Figure 3:
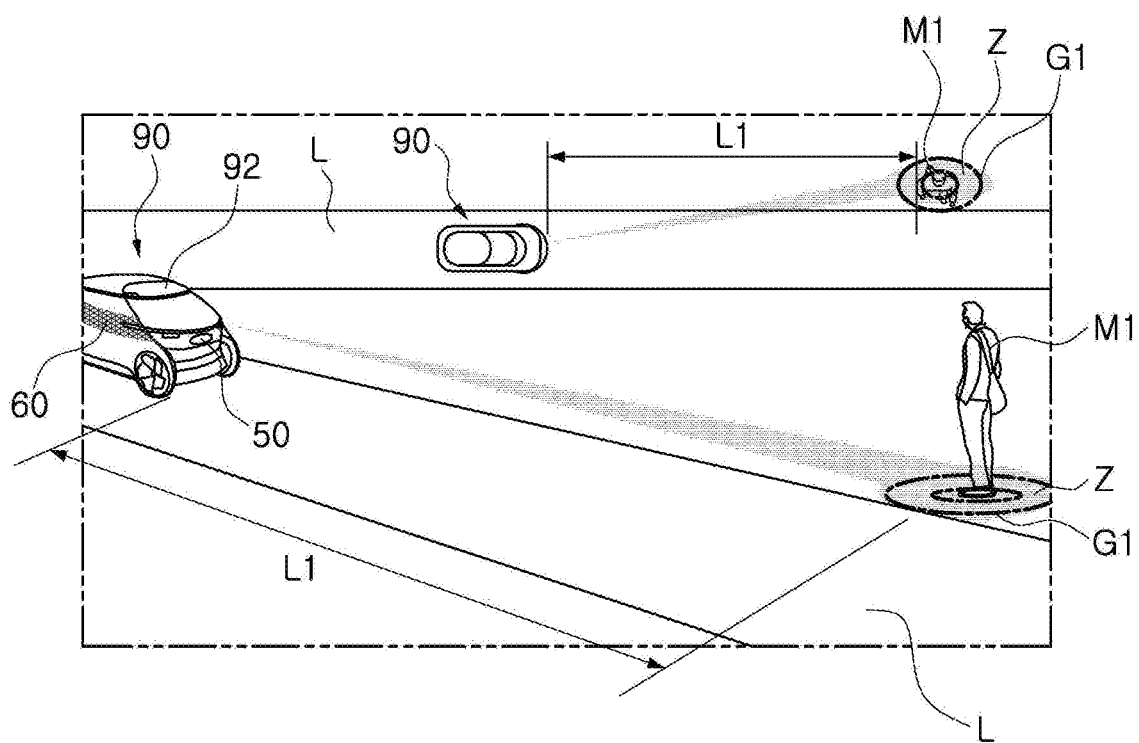
FIG. 3 illustrates that the autonomous vehicle in accordance with the embodiment of the present invention senses a pedestrian and irradiates a hot spot zone.
Figure 4:
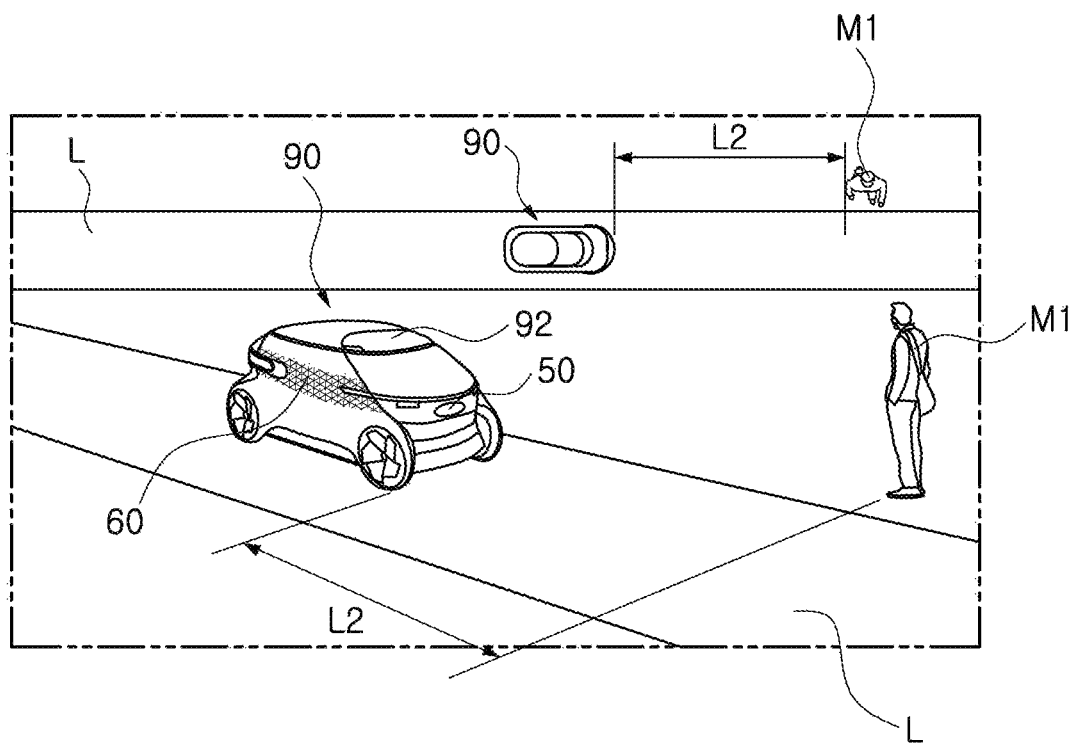
FIG. 4 illustrates that the autonomous vehicle in accordance with the embodiment of the present invention is moving.
Figure 5:
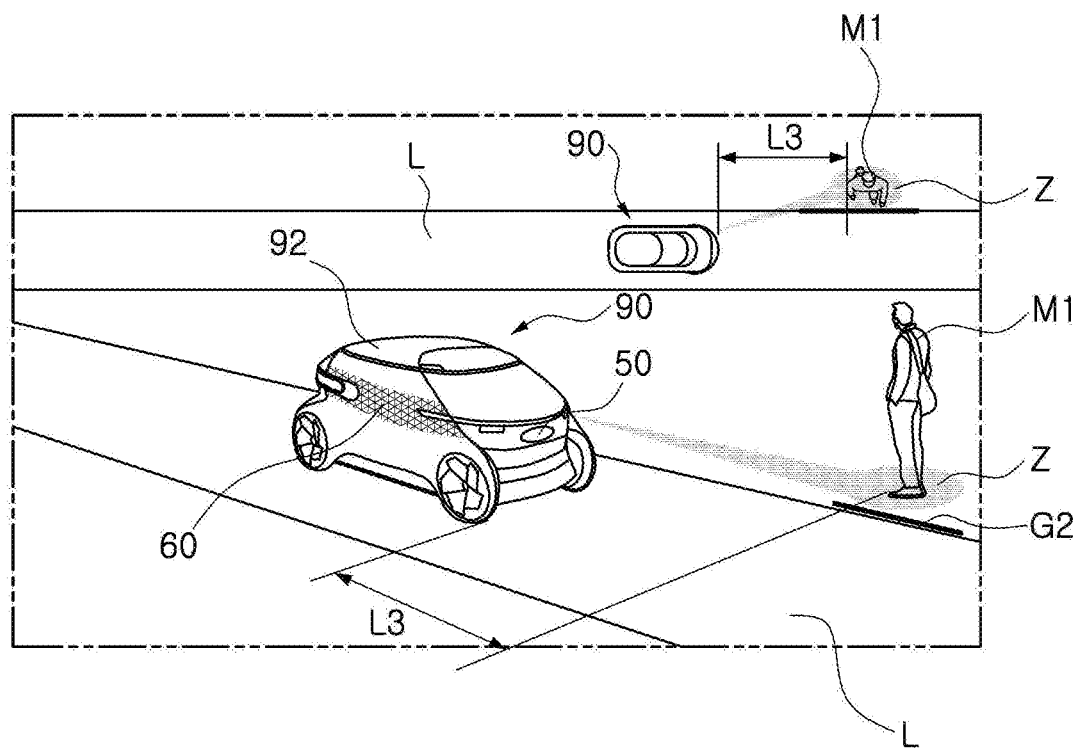
FIG. 5 illustrates that the autonomous vehicle in accordance with the embodiment of the present invention irradiates a hot spot zone and a guide line toward a pedestrian.
Figure 6:
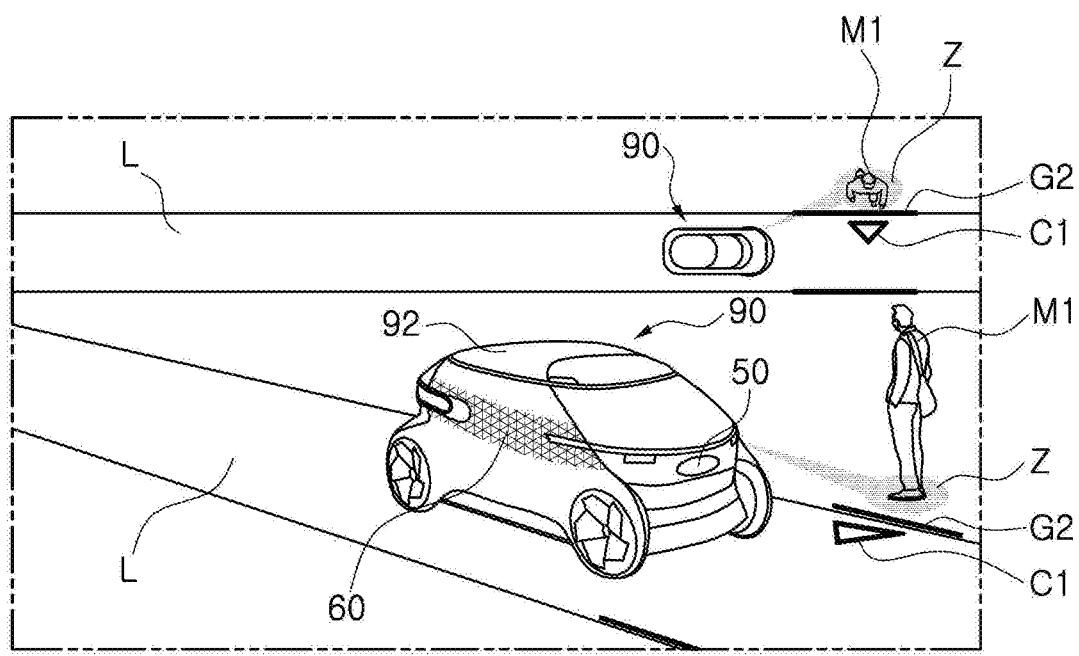
FIG. 6 illustrates that the autonomous vehicle in accordance with the embodiment of the present invention irradiates a guide line for preventing a pedestrian from crossing a road.
Figure 7:
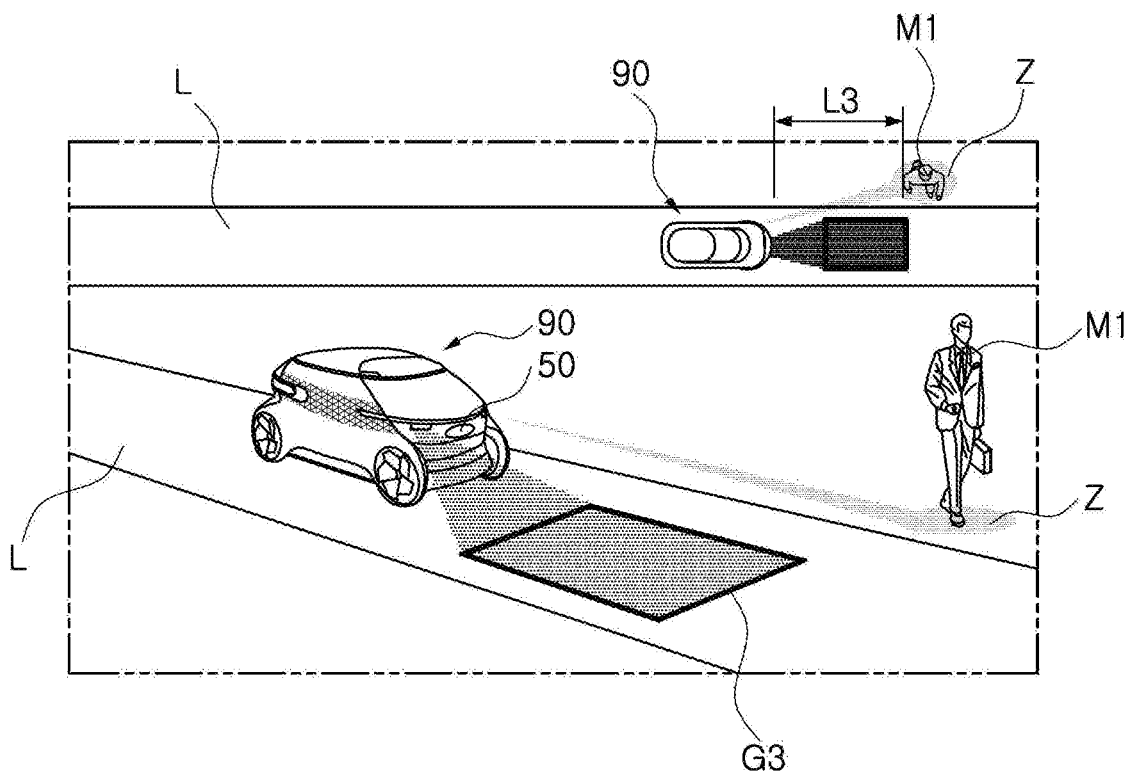
FIG. 7 illustrates that the autonomous vehicle in accordance with the embodiment of the present invention irradiates a guide line onto a stop position.
Figure 8:
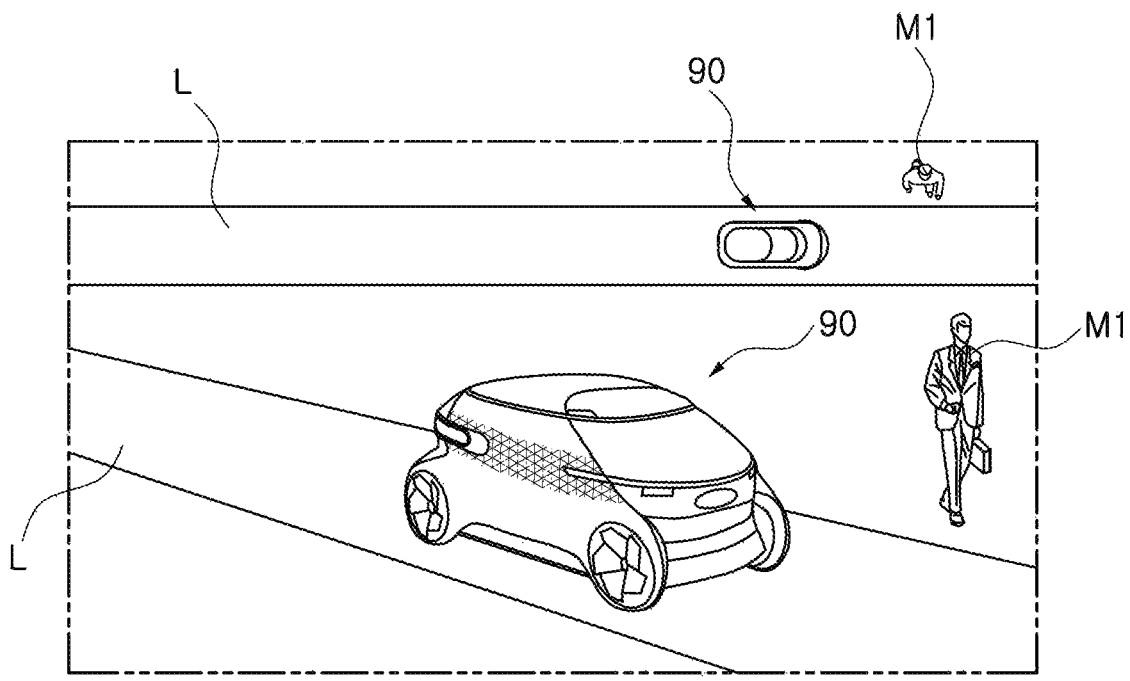
FIG. 8 illustrates that the autonomous vehicle in accordance with the embodiment of the present invention stops.
Figure 9:
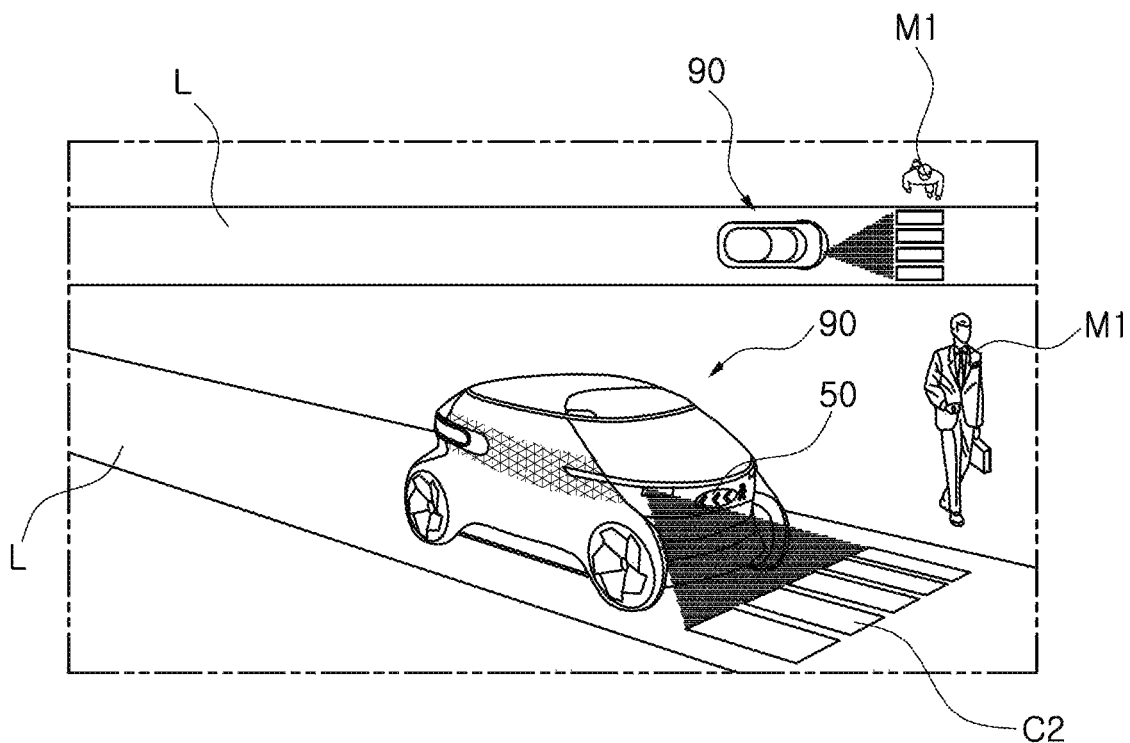
FIG. 9 illustrates that the autonomous vehicle in accordance with the embodiment of the present invention irradiates an image for guiding a pedestrian to cross a road.

FIG. 1 illustrates a control system of an autonomous vehicle in accordance with an embodiment of the present invention, FIG. 2 is a flowchart illustrating a control method of the control system of the autonomous vehicle in accordance with an embodiment of the present invention, FIG. 3 illustrates that the autonomous vehicle in accordance with the embodiment of the present invention senses a pedestrian and irradiates a hot spot zone, FIG. 4 illustrates that the autonomous vehicle in accordance with the embodiment of the present invention is moving, FIG. 5 illustrates that the autonomous vehicle in accordance with the embodiment of the present invention irradiates a hot spot zone and a guide line toward a pedestrian, FIG. 6 illustrates that the autonomous vehicle in accordance with the embodiment of the present invention irradiates a guide line for preventing a pedestrian from crossing a road, FIG. 7 illustrates that the autonomous vehicle in accordance with the embodiment of the present invention irradiates a guide line onto a stop position, FIG. 8 illustrates that the autonomous vehicle in accordance with the embodiment of the present invention stops, and FIG. 9 illustrates that the autonomous vehicle in accordance with the embodiment of the present invention irradiates an image for guiding a pedestrian to cross a road.

As illustrated in FIGS. 1 to 9, the control system 1 of the autonomous vehicle in accordance with the embodiment of the present invention may include a camera unit 10, a measurement unit 20, a control unit 30 and an image irradiation unit 40. The camera unit 10 may be installed on a vehicle body 92 and take an image of a pedestrian M1. The measurement unit 20 may be installed on the vehicle body 92 and measure the position of the pedestrian M1 and a distance from the pedestrian M1. The control unit 30 may receive the data of the camera unit 10 and the measurement unit 20. The image irradiation unit 40 may operate according to a control signal of the control unit 30, and irradiate light onto any one of the pedestrian M1 and a road L. The control system 1 of the autonomous vehicle in accordance with the embodiment of the present invention may further include an image display unit 50, a side display unit 60, a scanning unit 70, a guide irradiation unit 80 and a sensor unit 100.

The plurality of camera units 10 for taking images of the pedestrian M1 may be installed on the vehicle body 92 of the autonomous vehicle 90. The plurality of camera units 10 may be installed around the vehicle body 92, take images of the external conditions and the pedestrian M1, and transfer the taken images to the control unit 30.

The measurement unit 20 may be installed on the vehicle body 92, measure the position of the pedestrian M1 ahead of the vehicle body 92 and the distance from the pedestrian M1, and transfer the measured position and distance to the control unit 30. The measurement unit 20 in accordance with an embodiment may include a position measurement unit 22 and a distance measurement unit 24.

The position measurement unit 22 may measure the position of the pedestrian M1, and transfer the measured value to the control unit 30. The distance measurement unit 24 may measure the distance between the pedestrian M1 and the vehicle body 92, and transfer the measured value to the control unit 30. One or more of a LiDAR (Light Detection and Ranging), radar and camera may be used as the position measurement unit 22 and the distance measurement unit 24. In addition, various measurement devices may be used as the position measurement unit 22 and the distance measurement unit 24.

The control unit 30 may receive data of the camera unit 10, the measurement unit 20, the scanning unit 70 and the sensor unit 100, and control operations of the image irradiation unit 40, the image display unit 50, the side display unit 60 and the guide irradiation unit 80.

The image irradiation unit 40 may operate according to a control signal of the control unit 30, and various irradiation devices may be used as the image irradiation unit 40, as long as they can irradiate light onto one or more of the pedestrian M1 and the road L. The image irradiation unit 40 in accordance with the embodiment of the present invention may include first and second irradiation units 42 and 44. The first irradiation unit 42 may irradiate light to the lower side of the pedestrian M1, and the second irradiation unit 44 may irradiate an image onto the surface of the road L.

The first irradiation unit 42 may form a hot spot zone Z by irradiating light to the lower side of the pedestrian M1, such that the pedestrian M1 can be more reliably recognized. Even when there are a plurality of pedestrians M1, the plurality of first irradiation units 42 may individually operate to form hot spot zones Z where light is concentrated on the lower sides of the respective pedestrians M1. The first irradiation unit 42 may also irradiate a guide line G1 to form a red circle around the feet of the first irradiation unit 42. For this operation, the first irradiation unit 42 may use various light sources such as laser and lamp.

As the second irradiation unit 44, various types of irradiation devices may be used as long as they can irradiate an image onto the surface of the road L. The second irradiation unit 44 may be implemented with a panel or scanner for a micro display (MD) based on a projection scheme, such as a DMD (Digital Micromirror Device) or LCOS (Liquid Crystal On Silicon), or implemented with a panel using a direct projection scheme, such as an LCD (Liquid Crystal Display) or DMS (Digital MicroShutter Display).

The image display unit 50 may be installed on one or more of the front and side surfaces of the vehicle body 92, and modified in various manners as long as the image display unit 50 can inform the pedestrian M1 of information as an image. The image display unit 50 in accordance with an embodiment may be configured to display an image through an LED or liquid crystal screen, and installed in such a manner that contents can be identified even from a distance of about 30 m. When a character is displayed through the image display unit 50 serving as a display at the front of the vehicle, the image display unit 50 may have a vertical length of 150 mm or more. However, the image display unit 50 is not limited thereto, but modified in various sizes.

The side display unit 60 may be installed at the side surface of the vehicle body 92, and operated to display a specific pattern of image to a target passenger M2 according to a control signal of the control unit 30. Thus, the target passenger M2 may easily recognize the vehicle to get in. The side display unit 60 in accordance with an embodiment may be configured to output a specific pattern of image using a lighting, and modified in various manners. For example, a separate liquid crystal panel or optical fiber may be installed to output a specific pattern.

The scanning unit 70 may scan the body of the target passenger M2, and transfer the scan result to the control unit 30. The scanning unit 70 may take an image of a part of the target passenger M2, such as the face, iris, fingerprint or palm, by which the target passenger M2 can be specified, and transfer the taken image to the control unit 30. Thus, a door of the autonomous vehicle 90 can be opened without a separate smart key or the like.

The guide irradiation unit 80 may be installed at a side surface and the like of the vehicle body 92, and irradiate light onto the ground surface at the lateral bottom of the vehicle body 92 in order to guide the target passenger M2 to get in the vehicle. The guide irradiation unit 80 in accordance with an embodiment may irradiate belt-shaped light onto the road L facing the side surface of the vehicle body 92, in order to guide the target passenger M2 to get in the vehicle.

The sensor unit 100 may be installed on the vehicle body 92, sense the pedestrian M1, take an image of the pedestrian M1, and transfer the sensing result and the taken image to the control unit 30. The sensor unit 100 may include one or more of a camera, laser and LiDAR. The sensor unit 100 may measure the height and position of the pedestrian M1, take an image of the pedestrian M1, and transfer the measured values and the taken image to the control unit 30, and the control unit 30 may determine the type of the pedestrian M1 based on the information measured through the sensor unit 100. Specifically, the control unit 30 may determine whether the pedestrian M1 is an adult, child or old man.

As illustrated in FIGS. 2 and 3, the control method of the control system 1 of the autonomous vehicle in accordance with the embodiment of the present invention may include a first measurement step S10 in which the measurement unit 20 is operated to measure the position of the pedestrian M1 and a distance from the pedestrian M1.

The position measurement unit 22 installed in the control system 1 of the autonomous vehicle may be operated to measure the position of the pedestrian M1, and the distance measurement unit 24 may be operated to measure a distance between the pedestrian M1 and the vehicle body 92. Through the operation of the measurement unit 20, a target at a long distance can be recognized.

When the distance between the pedestrian M1 and the vehicle body 92 is within a first range L1, the first irradiation unit 42 may be operated to irradiate light to the lower side of the pedestrian M1, thereby forming a hot spot zone Z, at a first irradiation step S20.

When the distance between the pedestrian M1 and the vehicle body 92 is within the first range L1, the image irradiation unit 40 may be operated to irradiate light to the pedestrian M1 or around the pedestrian M1, thereby forming the hot spot zone Z. Thus, the pedestrian M1 can be easily recognized.

As illustrated in FIGS. 1, 2 and 4, the camera unit 10 may be operated to identify the pedestrian M1 at a second measurement step S30. The measured value of the camera unit 10 may be transferred to the control unit 30, and the control unit 30 may determine whether an object recognized as the pedestrian M1 through image recognition is a person. At this time, since the light irradiated from the image irradiation unit 40 is irradiated to the pedestrian M1, the camera unit 10 may recognize the object more clearly. When lighting is sufficiently secured as in the daytime, rays capable of specifying an object may be irradiated to the pedestrian M1. Thus, the camera unit 10 can recognize the object more clearly.

As illustrated in FIGS. 1, 2 and 5, when the distance between the pedestrian M1 and the vehicle body 92 is within a second range L2, the first irradiation unit 42 may be operated to form a hot spot zone Z and a guide line G2 at the lower side of the pedestrian M1 at a second irradiation step S40. At the second irradiation step S40, the first irradiation unit 42 may form the guide line G2 by irradiating colorful light to the boundary between the pedestrian M1 and the road L facing the pedestrian M1.

Since the red guide line G2 is extended along the boundary between the sidewalk and the road L facing the pedestrian M1, the red guide line G2 may warn the pedestrian M1 against crossing the road L without permission.

As illustrated in FIGS. 1, 2 and 6, when the distance between the pedestrian M1 and the vehicle body 92 becomes shorter than a third distance L3, the first and second irradiation units 42 and 44 may be operated to provide the pedestrian M1 with an image related to road crossing at a third irradiation step S50.

When the control unit 30 receiving the information of the measurement unit 20 determines that the vehicle has precedence over the pedestrian M1 at the third irradiation step, the first and second irradiation units 42 and 44 may display a contents image C1 to warn the pedestrian M1 against crossing the road L. At this time, the control unit 30 may determine which of the vehicle and the pedestrian has precedence, through various methods. For example, the control unit 30 may receive a signal of a signal device installed on the road and determine which of the vehicle and the pedestrian has precedence. Alternatively, the control unit 30 may determine which of the vehicle and the pedestrian has precedence, based on a traffic signal taken through the camera unit 10.

The warning image may be displayed on the surface of the road L or displayed on the front or side surface of the vehicle body 92. The contents image C1 in accordance with an embodiment may be mainly displayed on the road L, but modified in various manners. For example, the contents image C1 may be displayed on the road L and the outside of the vehicle body 92 at the same time. When the vehicle has precedence, a specific pictogram or text may be displayed to warn the pedestrian M1 against crossing the road L. At this time, sound may also be outputted.

As illustrated in FIGS. 1, 2 and 7, when the control unit 30 receiving the information of the measurement unit 20 determines that the pedestrian M1 has precedence at the third irradiation step, the vehicle may irradiate a guide line G3 having a rectangular frame shape onto the road surface at a stop position, and then stop ahead of the pedestrian M1 as illustrated in FIG. 8. As illustrated in FIG. 9, the vehicle may irradiate a contents image C2 onto the road L facing the pedestrian M1, the contents image C2 guiding the pedestrian M1 to cross the road L.

That is, when the pedestrian M1 has precedence in the case that the vehicle body 92 reaches a position at a third distance L3 from the pedestrian M1, the image irradiation unit 40 may irradiate the rectangular frame-shaped guide line G3 at a stop position of the autonomous vehicle 90.

Then, the vehicle may stop after displaying one or more of a pictogram, text and sound on the road L1 facing the pedestrian M1.

The second range L2 may be larger than the third distance L3, and the first range L1 may be larger than the second range L2. That is, the lower limit of the second range L2 may be larger than the third distance L3, and the lower limit of the first range L1 may be larger than the upper limit of the second range L2. In an embodiment, the intermediate value of the first range L1 may be set to 150 m, the intermediate value of the second range L2 may be set to 100 m, and the third distance L3 may be set to 50 m. However, the present invention is not limited thereto, but the values may be varied depending on conditions.

Hereafter, a control method of a control system 1 of an autonomous vehicle in accordance with another embodiment of the present invention will be described with reference to the drawings.

For convenience of description, components which are configured and operated in the same manner as those of the above-described embodiment may be represented by like reference numerals, and the detailed descriptions thereof will omitted herein.

Figure 10:
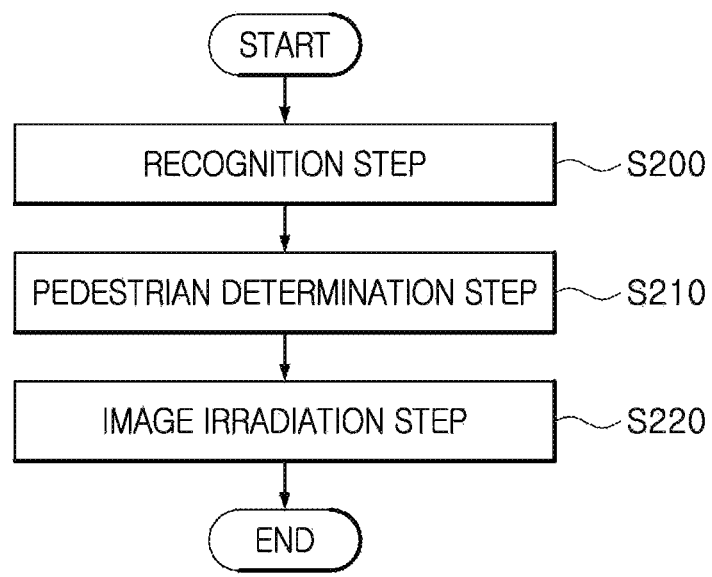
FIG. 10 is a flowchart illustrating a control method of a control system of an autonomous vehicle in accordance with another embodiment of the present invention.
Figure 11:
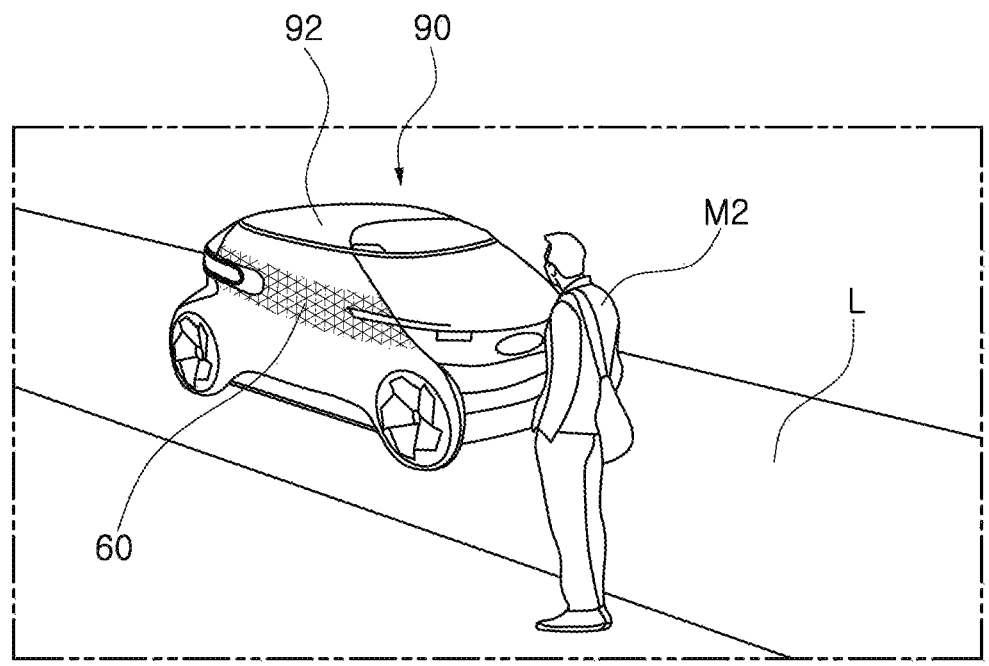
FIG. 11 illustrates that the autonomous vehicle in accordance with the embodiment of the present invention is moving toward a target passenger.
Figure 12:
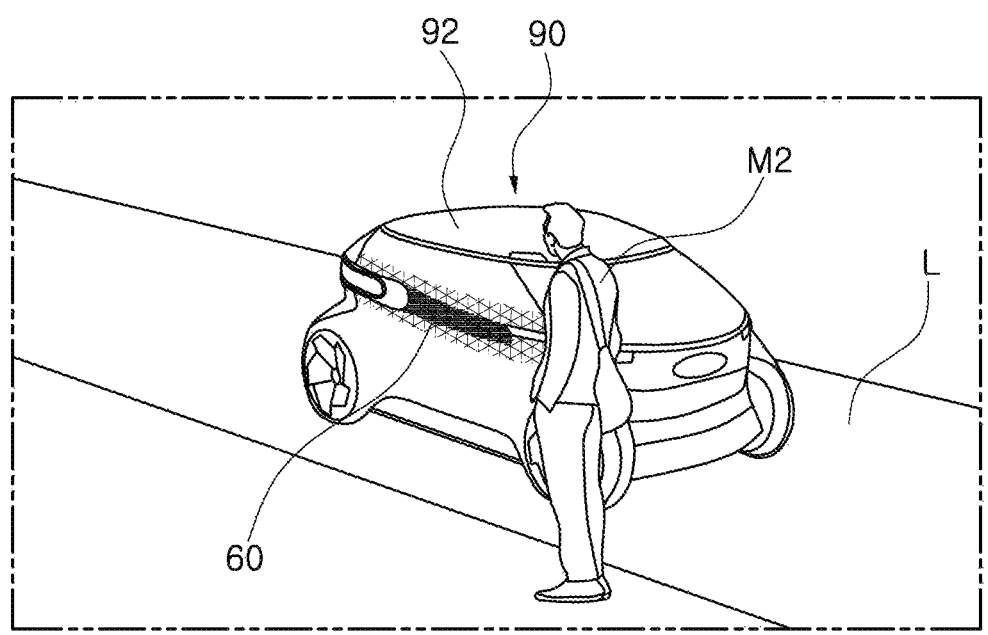
FIG. 12 illustrates that a specific pattern of image is displayed on the autonomous vehicle in accordance with the embodiment of the present invention.
Figure 13:
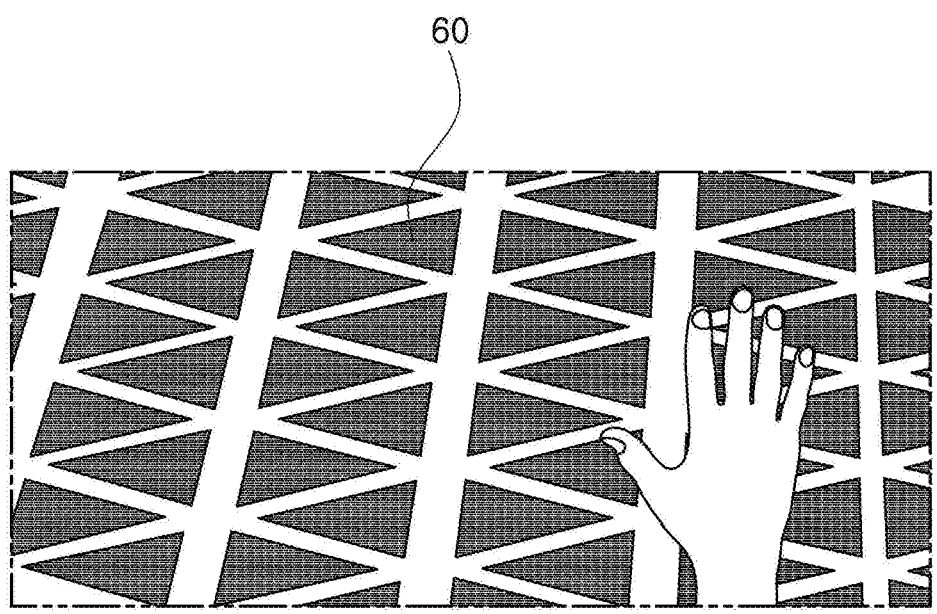
FIG. 13 illustrates that a scanning unit in accordance with the embodiment of the present invention takes an image of a hand of a target passenger.

FIG. 10 is a flowchart illustrating a control method of a control system of an autonomous vehicle in accordance with another embodiment of the present invention, FIG. 11 illustrates that the autonomous vehicle in accordance with the embodiment of the present invention is moving toward a target passenger, FIG. 12 illustrates that a specific pattern of image is displayed on the autonomous vehicle in accordance with the embodiment of the present invention, and FIG. 13 illustrates that a scanning unit in accordance with the embodiment of the present invention takes an image of a hand of a target passenger.

As illustrated in FIGS. 10 to 13, the autonomous vehicle 90 may move toward a target passenger M2 and inform the target passenger M2 that the autonomous vehicle 90 is a vehicle to get in, through a lighting of the side display unit 60 of the vehicle. Furthermore, the autonomous vehicle 90 may open/close a door and induce the target passenger M2 to get in the vehicle, through a lighting pattern, which makes it possible to improve the convenience of the passenger.

The control method of the control system 1 of the autonomous vehicle in accordance with the embodiment of the present invention may include a moving step S100 in which the vehicle body 92 moves toward the target passenger M2. The target passenger M2 may send a signal to the autonomous vehicle 90 using a smart phone or smart watch, and call the autonomous vehicle 90 through other various methods. Then, the autonomous vehicle 90 may move toward the target passenger M2.

As illustrated in FIG. 12, the vehicle may display a specific pattern of image to the target passenger M2 through the side display unit 60 at a pattern display step S110. Since an individualized pattern lighting is displayed on the exterior of the vehicle, the target passenger M2 may recognize that the autonomous vehicle 90 is a vehicle which the target passenger M2 will get in.

The vehicle body 92 of the autonomous vehicle 90 may stop in front of the target passenger M2 at a stop step S120.

Then, the control unit 30 may scan the body of the target passenger M2 through the scanning unit 70, and then identify the target passenger M2 based on the information of the scanning unit 70, at an identification step S130. At the identification step, the control unit 30 may scan one or more of the palm, face and iris of the target passenger M2, and determine whether the scanned information coincides with information stored in a storage unit. Alternatively, as illustrated in FIG. 13, the target passenger M2 may add a hand gesture to a pattern displayed on the side display unit 60 after the vehicle stops, in order to specify the target passenger M2. Alternatively, the control unit 30 may recognize the face of the target passenger M2 through the scanning unit 70 installed in the control system 1 of the autonomous vehicle, in order to specify the target passenger M2.

When the authentication for the target passenger M2 passes at the identification step, a door may be automatically opened at an opening step S140. Although the lighting of the side display unit 60 installed at the side surface of the vehicle body 92 is mainly operated, the guide irradiation unit 80 may be operated to irradiate guide light onto the road surface at the door, and guide the target passenger M2 to get in the vehicle.

Hereafter, a control method of a control system 1 of an autonomous vehicle in accordance with still another embodiment of the present invention will be described with reference to the drawings.

For convenience of description, components which are configured and operated in the same manner as those of the above-described embodiment may be represented by like reference numerals, and the detailed descriptions thereof are omitted herein.

Figure 14:
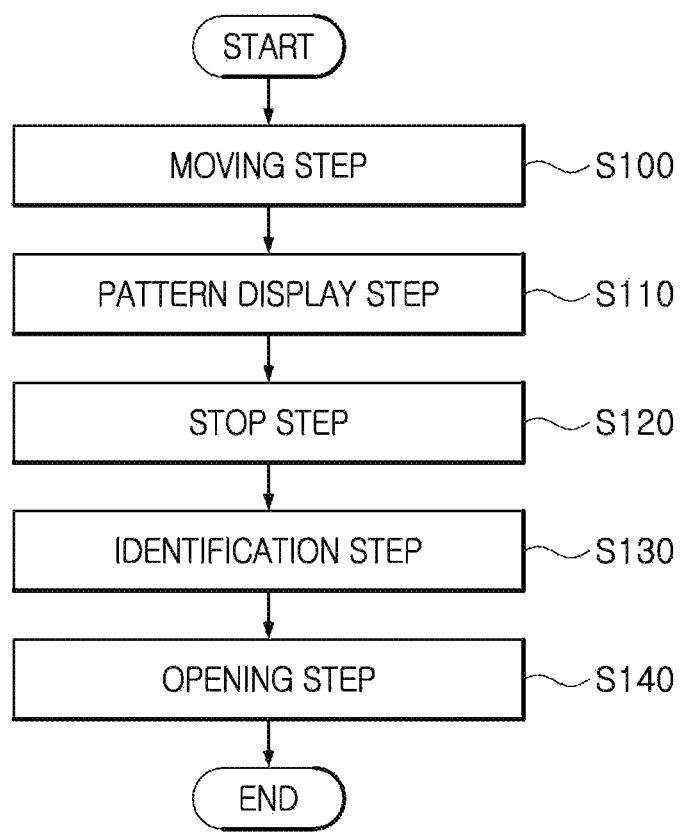
FIG. 14 is a flowchart illustrating a control method of a control system of an autonomous vehicle in accordance with still another embodiment of the present invention.
Figure 15:
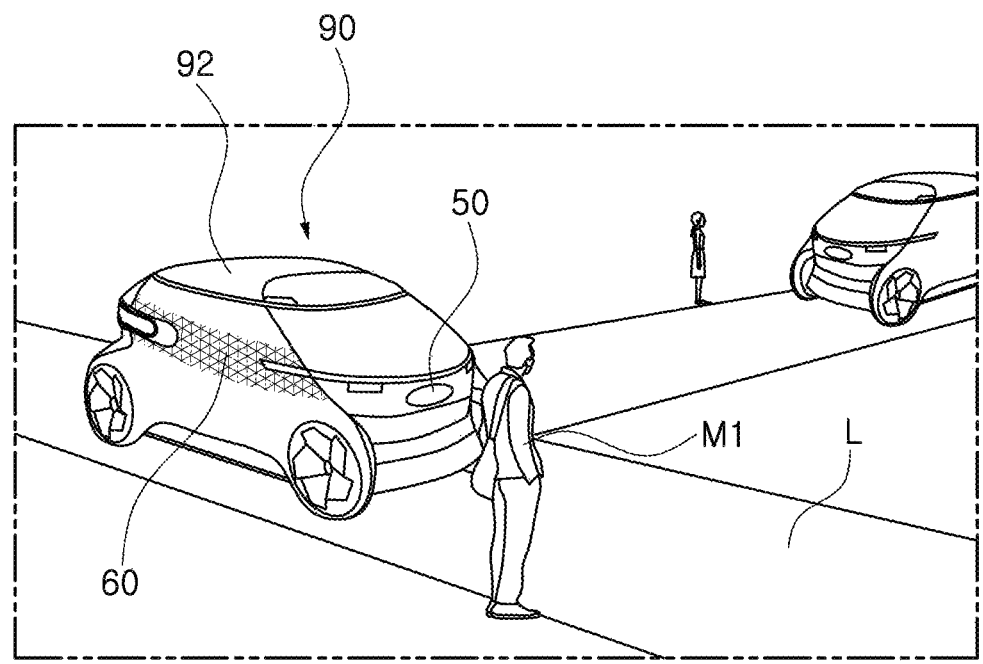
FIG. 15 illustrates that the autonomous vehicle in accordance with the embodiment of the present invention approaches a pedestrian.
Figure 16:
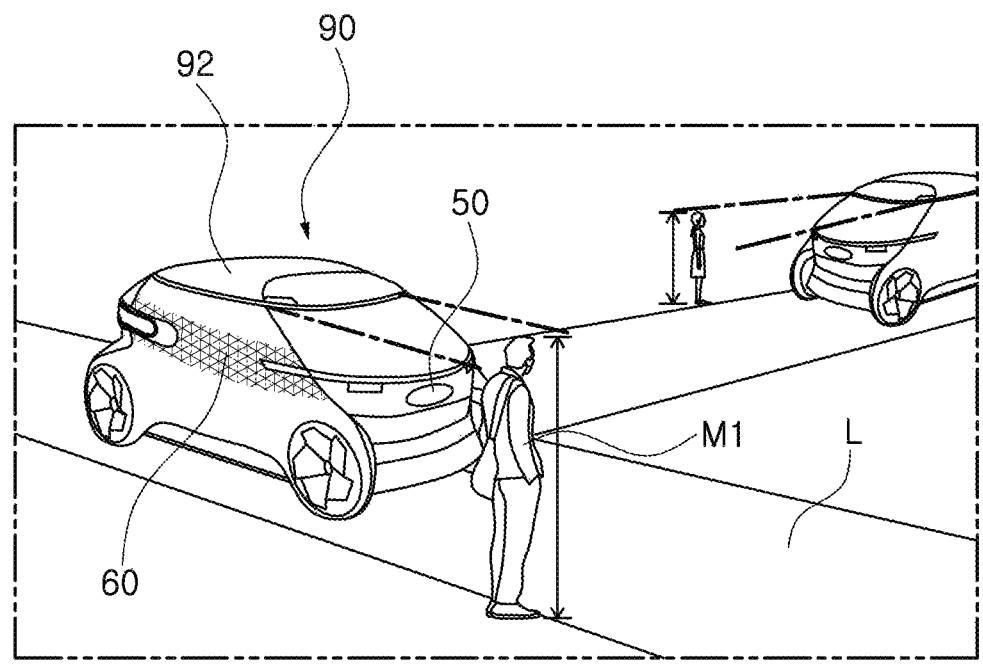
FIG. 16 illustrates that the autonomous vehicle in accordance with the embodiment of the present invention recognizes the height and age of a pedestrian.
Figure 17:
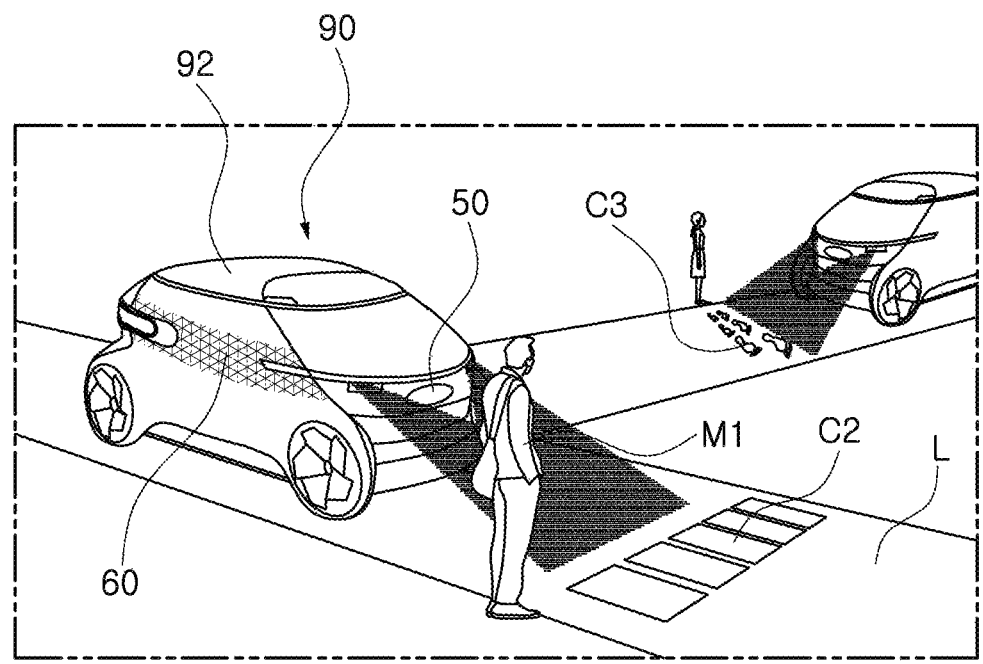
FIG. 17 illustrates that the autonomous vehicle in accordance with the embodiment of the present invention irradiates an image suitable for a pedestrian onto a road surface.
Figure 18:
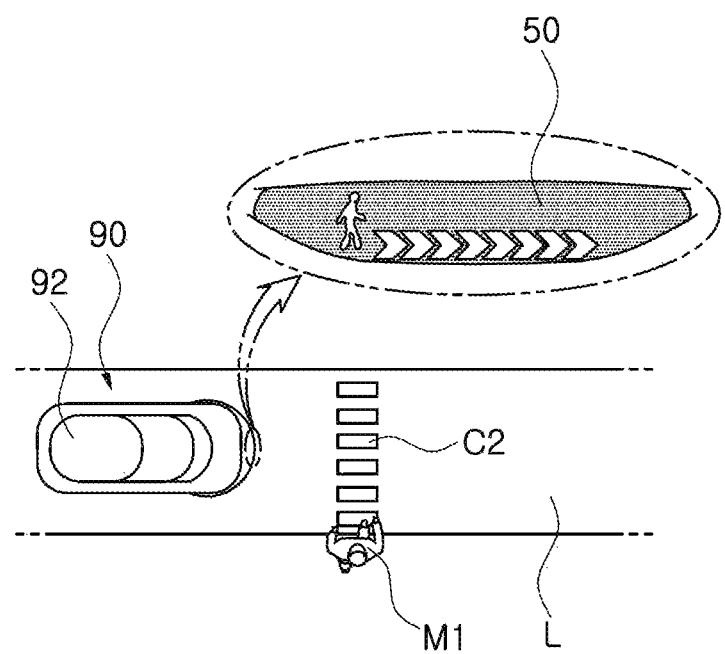
FIG. 18 illustrates that the autonomous vehicle in accordance with the embodiment of the present invention irradiates an image suitable for an adult pedestrian onto a road surface.
Figure 19:
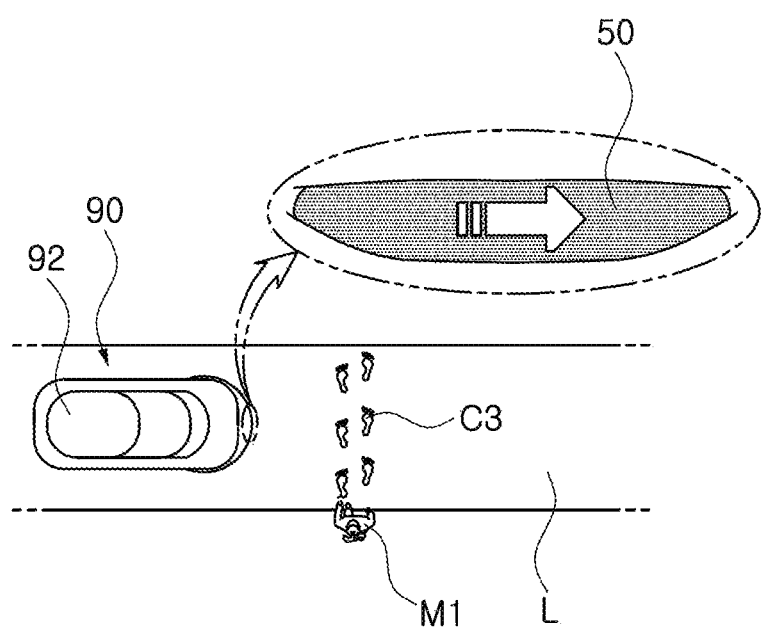
FIG. 19 illustrates that the autonomous vehicle in accordance with the embodiment of the present invention irradiates an image suitable for a child pedestrian onto a road surface.
Figure 20:
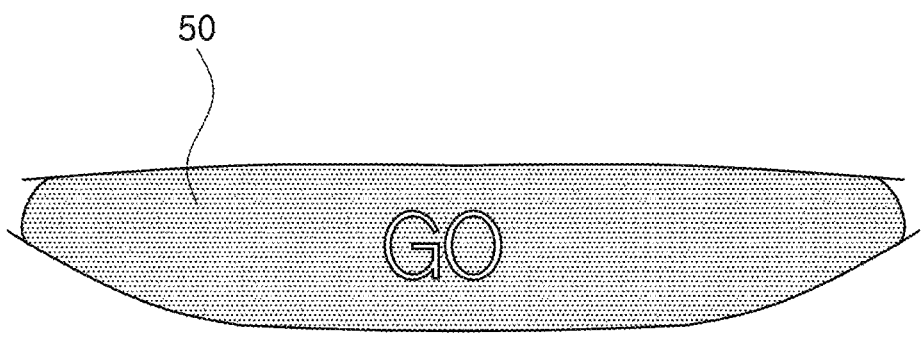
FIG. 20 illustrates an image display unit of the autonomous vehicle in accordance with the embodiment of the present invention.

FIG. 14 is a flowchart illustrating a control method of a control system of an autonomous vehicle in accordance with still another embodiment of the present invention, FIG. 15 illustrates that the autonomous vehicle in accordance with the embodiment of the present invention approaches a pedestrian, FIG. 16 illustrates that the autonomous vehicle in accordance with the embodiment of the present invention recognizes the height and age of a pedestrian, FIG. 17 illustrates that the autonomous vehicle in accordance with the embodiment of the present invention irradiates an image suitable for a pedestrian onto a road surface, FIG. 18 illustrates that the autonomous vehicle in accordance with the embodiment of the present invention irradiates an image suitable for an adult pedestrian onto a road surface, FIG. 19 illustrates that the autonomous vehicle in accordance with the embodiment of the present invention irradiates an image suitable for a child pedestrian onto a road surface, and FIG. 20 illustrates an image display unit of the autonomous vehicle in accordance with the embodiment of the present invention.

As illustrated in FIGS. 14 to 20, the control method of the control system 1 of the autonomous vehicle in accordance with the embodiment of the present invention may analyze images of the camera unit 10 and the sensor unit 100 when a pedestrian M1 approaches the vehicle which is autonomously driving, and provide contents suitable for the pedestrian M1, thereby preventing a safety accident.

As illustrated in FIGS. 15 and 16, the control method of the control system 1 of the autonomous vehicle in accordance with the embodiment of the present invention may include a recognition step S200 of sensing the pedestrian M1 through the sensor unit 100. The presence or absence of the pedestrian M1 in front of the autonomous vehicle 90 may be determined by the camera unit 10 and the measurement unit 20, and one or more pieces of information of the camera unit 10, the measurement unit 20 and the sensor unit 100 may be transferred to the control unit 30.

The control unit 30 may determine the type of the pedestrian M1 based on the information measured through the sensor unit 100 at a pedestrian determination step S210. The control unit 30 may classify the type of the pedestrian M1 into an adult, old man or child, through image analysis.

As illustrated in FIG. 17, an image suitable for the type of the pedestrian M1 may be irradiated onto the road L at an image irradiation step S220. Through the image display unit 50 and the image irradiation unit 40 which are installed at the front of the autonomous vehicle 90, contents may be displayed on the road surface. At this time, sound may be combined.

As illustrated in FIG. 18, when the pedestrian M1 is an adult, a contents image C2 may be displayed in the form of a crosswalk on the surface of the road L, and an image of a person and arrow may be displayed on the image display unit 50.

When the pedestrian M1 is a child as illustrated in FIG. 19, graphic such as a pictogram suitable for inducing a moving line of the child may be utilized rather than a character, and footprint-shaped sequential animation may be displayed as a contents image C3.

When the pedestrian M1 is an old man, the size of the displayed graphic contents may be raised by 50%, and the volume of the sound may be raised.

In accordance with the embodiments of the present invention, the control system and the control method may help the autonomous vehicle 90 and the pedestrian M1 to recognize each other in a range from a long distance to a short distance, and thus guide the pedestrian M1 to cross the road L or stop the pedestrian M1 from crossing the road L, which makes it possible to secure the safety of the pedestrian M1. Furthermore, the autonomous vehicle 90 may approach a passenger and inform the passenger that the autonomous vehicle 90 is a vehicle to get in, using the side lighting of the autonomous vehicle 90. Furthermore, the autonomous vehicle 90 may open/close a door and induce the passenger to get in the vehicle, using a lighting pattern, which makes it possible to improve the convenience of the passenger. Furthermore, when the pedestrian M1 approaches the autonomous vehicle which is autonomously driving, the control unit 30 may analyze a camera sensor image, determine the height and age of the pedestrian M1, and provide contents suitable for the pedestrian M1, thereby securing the safety of the pedestrian M1. Furthermore, the control unit 30 may analyze the image of the camera unit 10 and the sensor unit 100 during autonomous driving, specify the position, distance, height, age or walking speed of the pedestrian M1, and display contents suitable for the pedestrian M1, which makes it possible to secure the safety.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A control system of an autonomous vehicle having a vehicle body, comprising:
    one or more sensors installed on the vehicle body, and configured to detect a pedestrian on a sidewalk next to a road on which the autonomous vehicle drives, a position of the pedestrian, and a distance from the autonomous vehicle to the pedestrian; and
    one or more light sources configured to irradiate light to one or more of the pedestrian and the road,
    wherein, when the pedestrian is detected, the control system of the autonomous vehicle is configured to cause the one or more light sources to:
        irradiate light around the pedestrian to form a first image on the sidewalk when the pedestrian is detected and the distance is greater than a predetermined value, and
        irradiate light around the pedestrian to form the first image on the sidewalk and irradiate light toward the road to form a second image on a surface of the road when the pedestrian is detected and the distance is smaller than the predetermined value,
    wherein when the pedestrian is detected, the control system is further configured to cause the one or more light sources to:
        irradiate light around the pedestrian to form the first image on the sidewalk when the distance is greater than the predetermined value and is within a first range, and
        irradiate light around the pedestrian to form the first image on the sidewalk and further irradiate light to the boundary between the sidewalk and the road to form a third image on the boundary when the distance is greater than the predetermined value and is within a second range, and
    wherein the autonomous vehicle is closer to the pedestrian when the distance is within the second range than when the distance is within the first range.

2. The control system of claim 1, wherein the one or more sensors comprise:
    a camera configured to detect the pedestrian.

3. The control system of claim 1, wherein the one or more light sources comprise:
    a first light source configured to irradiate light to around the pedestrian to form the first image; and
    a second light source configured to irradiate light onto the surface of the road to form the second image on the surface of the road.

4. The control system of claim 1, further comprising an image display installed at one or more of the front and side of the vehicle body, and configured to display a display image to inform the pedestrian of information.

5. The control system of claim 1, further comprising a side display installed at a side of the vehicle body, and configured to display a display image a target passenger.

6. The control system of claim 5, further comprising a scanner configured to scan the body of the target passenger.

7. The control system of claim 6, further comprising a guide light source installed on the vehicle body, and configured to irradiate light in a lateral direction of the vehicle body in order to guide the target passenger to get in the autonomous vehicle.

8. The control system of claim 1, wherein the control system is configured to stop the autonomous vehicle when the distance is smaller than the predetermined value while causing the one or more light sources to irradiate light around the pedestrian to form the first image on the sidewalk and irradiate light toward the road to form the second image on the surface of the road.

* * * * *